(No Model.)

J. METHERELL.
MACHINE FOR SCALPING AND BOLTING FLOUR.

No. 457,656. Patented Aug. 11, 1891.

Fig. 1.

WITNESSES:
J. A. Criswell
C. Sedgwick

INVENTOR:
J. Metherell
BY Munn & Co.
ATTORNEYS (No Model.) 6 Sheets—Sheet 2.

J. METHERELL.
MACHINE FOR SCALPING AND BOLTING FLOUR.

No. 457,656. Patented Aug. 11, 1891.

WITNESSES:

INVENTOR: J. Metherell
BY Munn & Co.
ATTORNEYS (No Model.) 6 Sheets—Sheet 3.

J. METHERELL.
MACHINE FOR SCALPING AND BOLTING FLOUR.

No. 457,656. Patented Aug. 11, 1891.

WITNESSES:
INVENTOR: J. Metherell
BY
ATTORNEYS

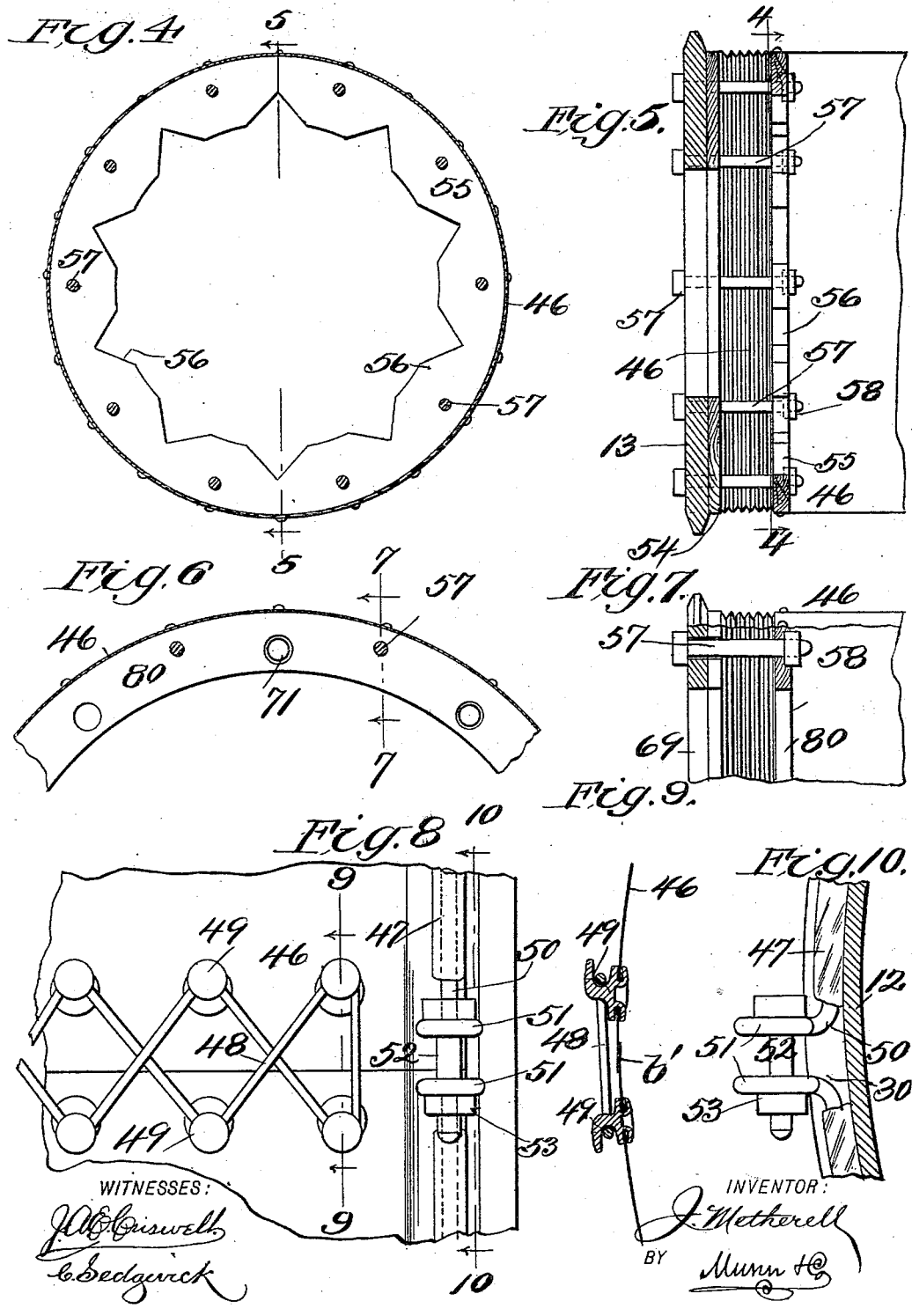

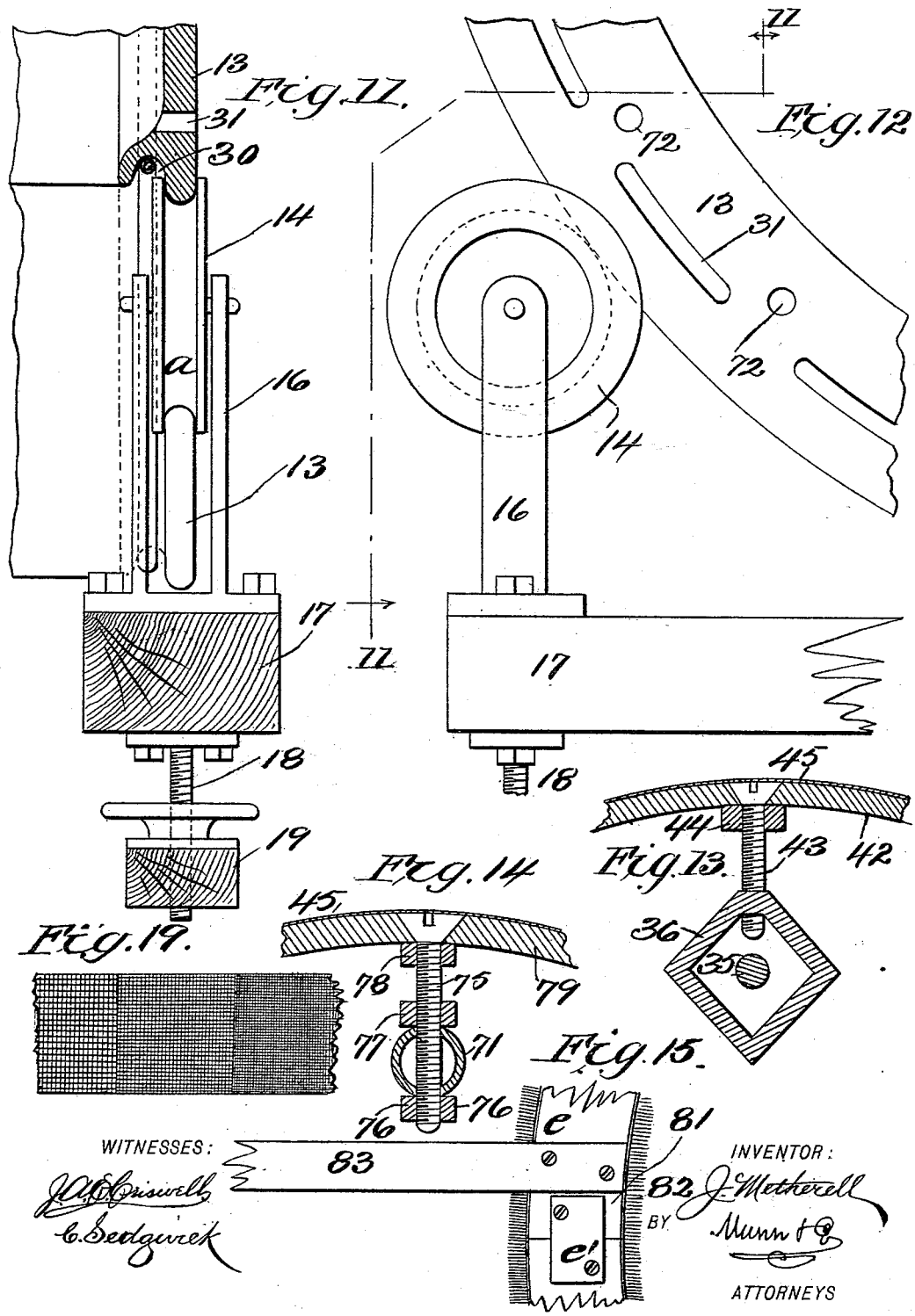

(No Model.) 6 Sheets—Sheet 6.
J. METHERELL.
MACHINE FOR SCALPING AND BOLTING FLOUR.
No. 457,656. Patented Aug. 11, 1891.
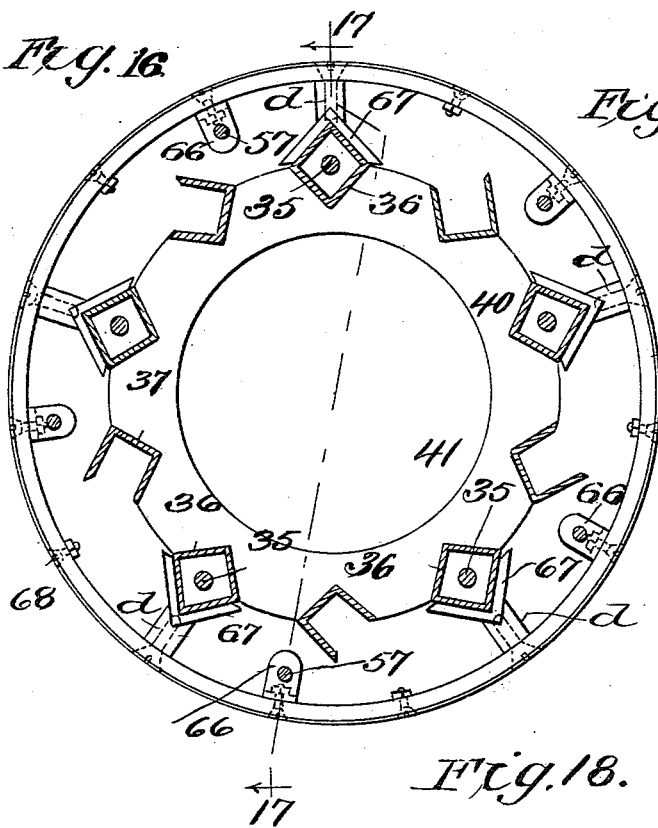
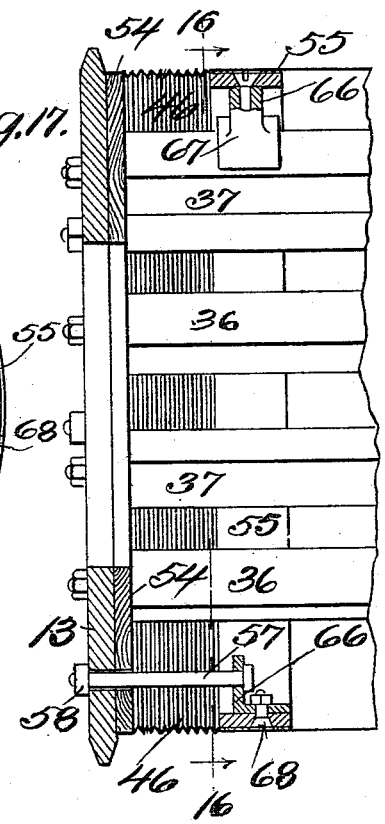
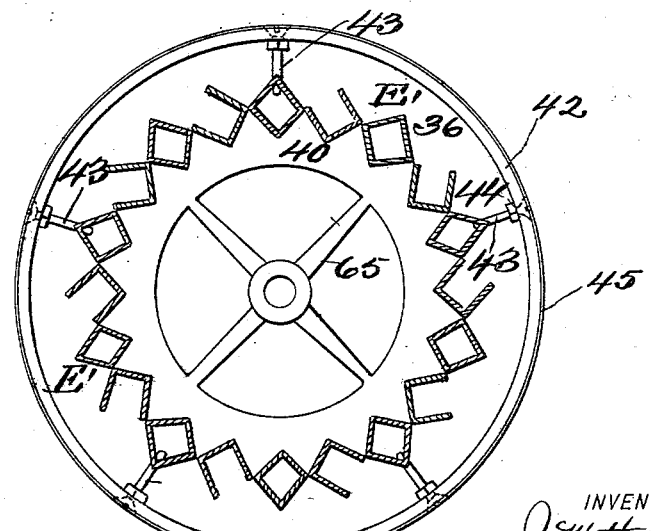
WITNESSES:
INVENTOR:
J. Metherell
BY Munn &Co.
ATTORNEYS

UNITED STATES PATENT OFFICE.

JOHN METHERELL, OF MURFREESBOROUGH, TENNESSEE, ASSIGNOR TO HIMSELF AND CHARLES O. THOMAS, SR., OF SAME PLACE.

MACHINE FOR SCALPING AND BOLTING FLOUR.

SPECIFICATION forming part of Letters Patent No. 457,656, dated August 11, 1891.

Application filed March 19, 1890. Serial No. 344,447. (No model.)

*To all whom it may concern:*

Be it known that I, JOHN METHERELL, of Murfreesborough, in the county of Rutherford and State of Tennessee, have invented a new and Improved Machine for Scalping and Bolting Flour, of which the following is a full, clear, and exact description.

My invention relates to an improved apparatus for scalping, rescalping, and bolting the flour from wheat or other grain after granulating, and has for its object to render pure flour and perfect separation of the various stocks simultaneously; and the invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 2:
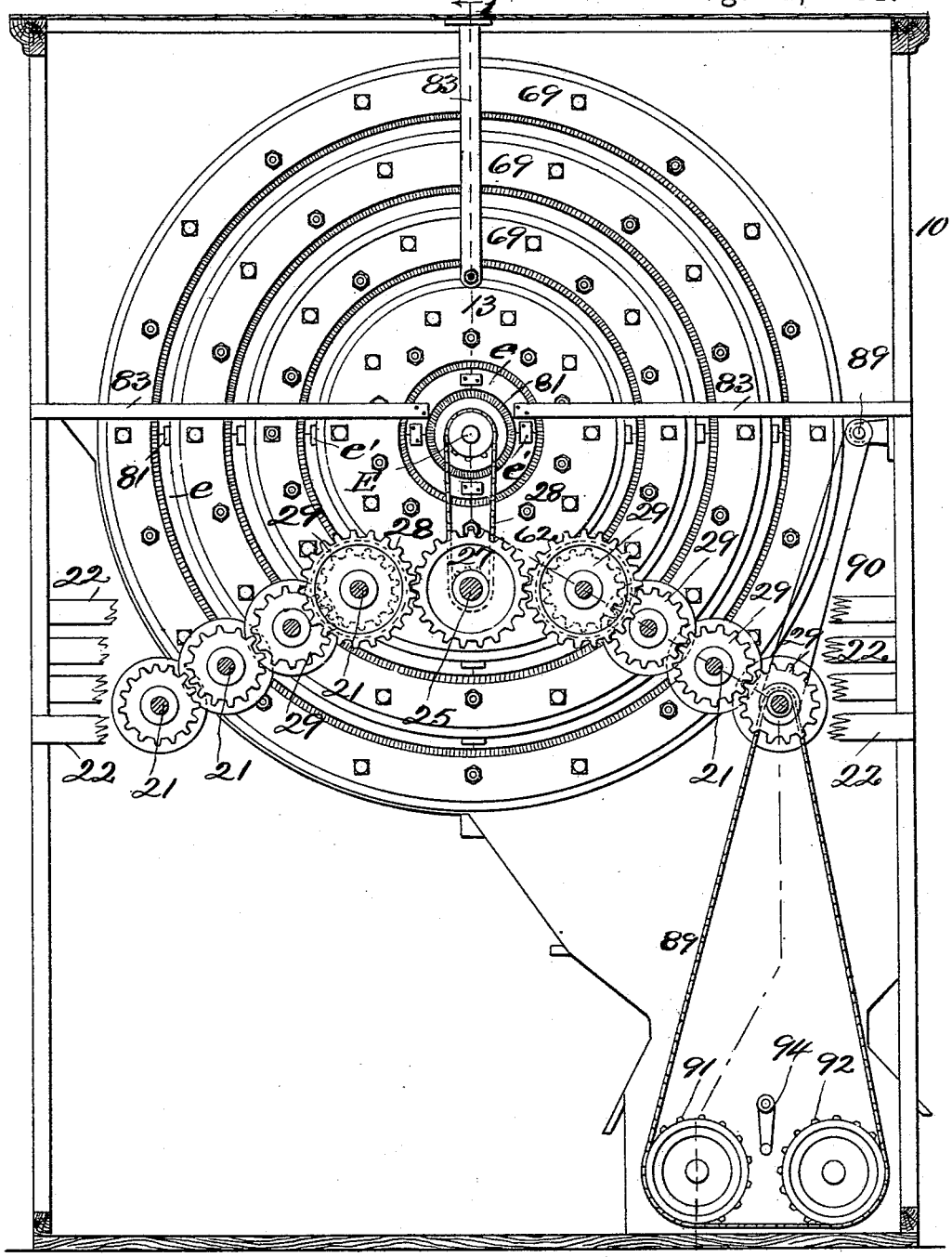
Figure 3:
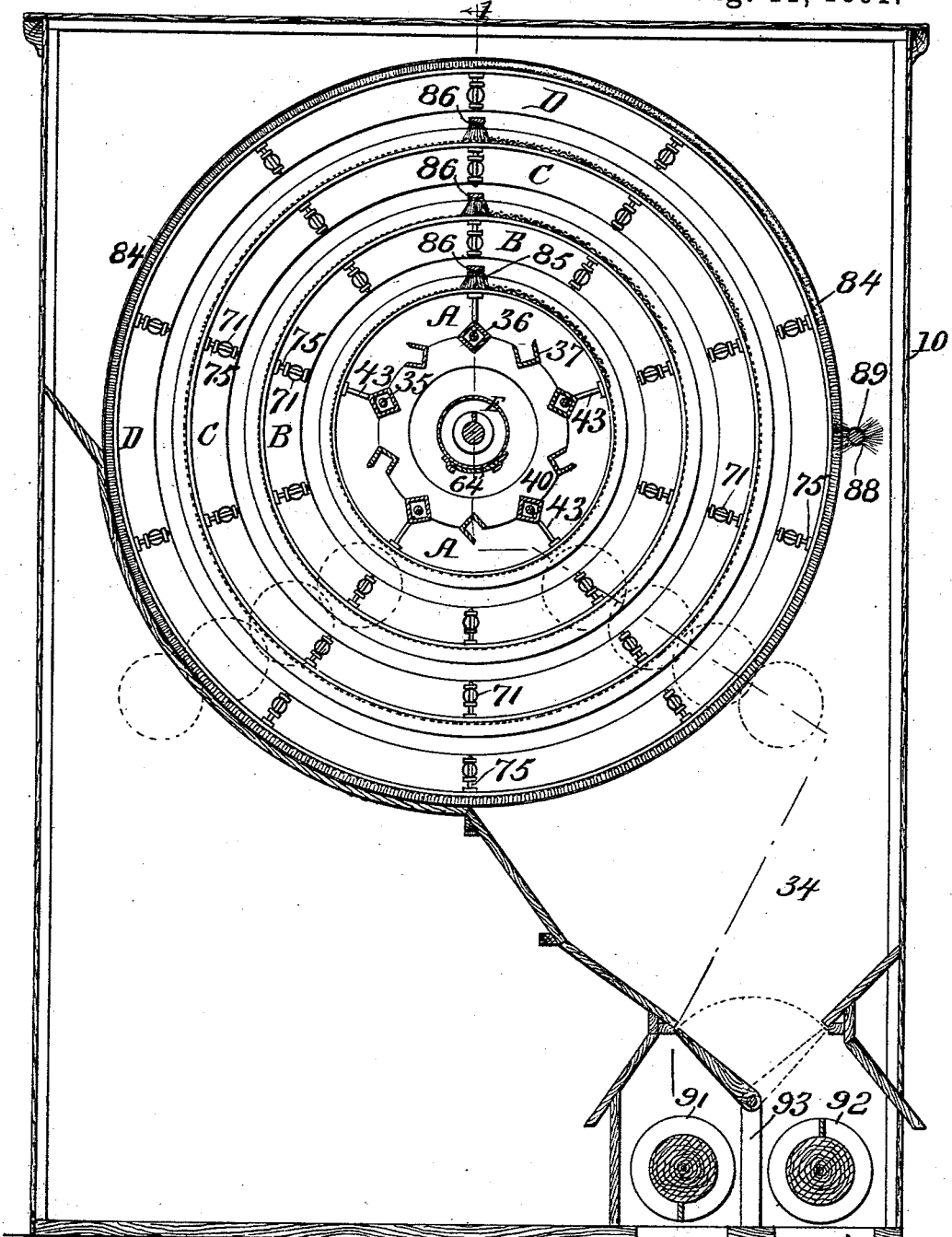

Figure 1 is a longitudinal vertical section taken on the lines 1 1 of Figs. 2 and 3. Fig. 2 is a vertical section through the frame, taken upon line 2 2 of Fig. 1, the heads of the reels being in elevation. Fig. 3 is a vertical section on line 3 3 of Fig. 1. Fig. 4 is a section on line 4 4 of Fig. 5, illustrating the cloth-adjusting ring used in connection with the head of the center reel. Fig. 5 is a vertical section through the head and ring, taken on line 5 5 of Fig. 4. Fig. 6 is a vertical section through one of the outer reels near the inner head, showing the form of adjusting-ring employed in connection with the bolting-cloth; and Fig. 7 is a diametrical section on line 7 7 of Fig. 6. Fig. 8 is a partial exterior side elevation of one of the reels, illustrating the manner of securing the longitudinal ends of the bolting-cloth. Fig. 9 is a section taken on line 9 9 of Fig. 8, and Fig. 10 is a section on line 10 10 of Fig. 8. Fig. 11 is a section taken on line 11 11 of Fig. 12, illustrating one of the adjustable sheaves which engages with the tails of the reels; and Fig. 12 is a side elevation of the view shown in Fig. 11. Fig. 13 is a detail sectional view through a portion of the inner reel, illustrating the manner of bracing the said reel and providing for surface adjustment. Fig. 14 is a similar detail section illustrating the manner of accomplishing the same results upon the outer reels. Fig. 15 is a detail view of a portion of one of the dust-rings. Fig. 16 is a diametrical section through the center reel near the head on the line 16 16 of Fig. 17, illustrating a modified form of the cloth-adjusting plate. Fig. 17 is a section taken on the line 17 17 of Fig. 16. Fig. 18 is a diametrical section through the center reel, illustrating the construction of said reel when used as a center reel only, and not in connection with a conveyer; and Fig. 19 is a detail view of a part of the center reel, showing the cloth thereof.

In carrying out the invention four reels A, B, C, and D are employed, held to revolve within a preferably rectangular casing 10, the heads of the various reels being ordinarily made to project beyond a front vertical partition 11, as illustrated in Fig. 1. The bolting-cloth attached to the reels is graduated in fineness—that is to say, the mesh of the cloth covering the inner reel is coarser than that of the next reel—the finest mesh of cloth being attached to the outer reel D, and the preferred texture of the cloth employed is 16, 20, and 24 wire on the inner reel, or corresponding numbers in grits-gauze or punctured zinc, No. 8 bolting-cloth upon the second reel, No. 10 bolting-cloth upon the third, and No. 14 bolting-cloth upon the outer reel, or in relative order to suit the degree of fineness of production on the stock being operated upon.

I have shown in Fig. 3 the bolting-cloths of the several reels in section for a portion of their circumference, the remainder being indicated in dotted lines. I have also shown in Fig. 19 the clothing of the center reel as formed in sections of different grades or degrees of fineness. It will be understood that where desired the reels B C D or any of them may be covered by cloths in sections of different grades. The reels are also graduated in length. The inner reel A is the longest and the outer reel D the shortest. The reels are further concentrically arranged and so adjusted with respect to each other that the steps of the heads and tails are essentially equal, as is also best illustrated in Fig. 1.

The tail 12 and likewise the head 13 of each reel consists of an annular or disk-like plate provided with a central circular opening, and the diameters of the plates and also the diameters of the plate-openings vary according to the location of the reel to which they are applied. The tail-plates 12 have a round peripheral surface, and the head-plates 13 a corresponding angular or V-shaped surface, and the head and tail plates of each reel are each adapted for engagement with two or more, preferably two, sheave-wheels. The sheave-wheels 14, engaging with the tail-plates, are provided with an essentially V-shaped peripheral groove *a*. (See Fig. 1.) The tail-sheaves engage with the tail-plates at the lower peripheral surface of the latter, one sheave at each side of a central line drawn perpendicularly through the reels, and as the tail-plates are stepped the sheaves 14 are similarly located. Each set of wheels 14 is held to turn in independent hangers 16, each attached to a cross-beam 17, and each cross-beam 17 rests upon and is attached to a jack or jacks 18, carried by a lower stationary cross-bar 19, which bar is usually secured at its ends to the frame of the apparatus, as illustrated in Fig. 1 and in the enlarged detail view in Fig. 11. By this means when desired the tail of each reel may be elevated so that it will incline in the direction of the front. The front sheave-wheels 15, which contact with the head-plates 13, are arranged in similar manner to the rear sheave-wheels 14. The front sheave-wheels, however, are each secured to a horizontal shaft 21, which shafts are journaled at their inner ends in stepped cross-bars 22, located in front of the partition 11 and attached to uprights 23, and the outer ends of the shafts are journaled in similarly-arranged permanent cross-bars 24, secured to the sides of the frame. This arrangement of the shafts is somewhat triangular and is clearly shown in Figs. 1 and 2.

The main or drive shaft 25 is located between the uppermost of the shafts 21 and is provided at its outer end with a drive-pulley 26 and between its ends with a spur-wheel 27, which wheel meshes with similar spur-wheels 28, located upon the said two shafts 21, which shafts at the rear of the spur-gears are each provided with a pinion 29, and each of the other shafts 21 is provided with a similar pinion, the pinions upon each side line of shafting being adapted to mesh with each other and with pinions upon the upper shafts 21. Thus from one drive-shaft independent movement is imparted to each of the reels.

The inner reel A differs materially in construction from any of the other reels. The heads and tails, however, in all of the reels are essentially alike and the tails are provided with a peripheral groove 30 near their inner edge, for a purpose hereinafter described, and with a series of slots 31 in their outer faces extending through to the interior of the reels, these slots being adapted for the exit of any tailings or particles of too great size to pass through the meshes of the bolting-cloth, and the said tailings or large particles when delivered from the reels drop into pockets or compartments 32, one of which is provided for each reel by means of vertical partition 33, located at the rear of the casing. The space between the front partition 11 and the inner rear partition 33 is of a length nearly corresponding to the length of the finest-meshed section of the outer reel D and constitutes a compartment 34 for the reception of the finest flour.

The construction of the inner reel is as follows: The head and tail plates 13 and 12 are connected by a series of bolts 35, which are each passed through a rib 36, essentially diamond shape in cross-section, the said ribs being of sufficient length to snugly abut at their extremities against the inner faces of the said plates, and between the diamond-shaped ribs ribs 37 are placed, representing in cross-section a three-quarter diamond, the open portions of which are made to face the periphery of the reel, forming, as it were, buckets or pockets. The latter ribs 37 also extend from the head to the tail plate, and within each rib 37 at its extremity a block 38 is secured, preferably made of wood, and the ribs are held in firm contact with the head and tail plates by bolts 39, which are passed through said blocks and plates, as best shown in Fig. 1. The attachment of the ribs 36 and 37 is effected between the periphery of the plates and the wall of their central opening. Two or more, preferably three, brace-rings 40 are employed in connection with the ribs, ordinarily made of wood and having a central opening 41 and angular peripheral recesses, whereby the ring may be snugly fitted to the surfaces of the ribs 36 and 37, facing the center of the reel, as best shown in Fig. 16. When three brace-rings are used, one is located at the center of the reel and the others near the ends, as illustrated in Fig. 1. A series of circular ribs 42, preferably constructed of sections of semicircular band-iron, is arranged at suitable distances apart between the head and tail plates 12 and 13, which ribs are preferably flat upon their inner and outer faces and of a diameter sufficient to create quite a space between them and the opposed surfaces of the longitudinal diamond-shaped ribs, as is best shown in Fig. 1—as, for instance, two inches, more or less, space should exist between the points of the diamond-shaped ribs and the cloth covering the reel, which two combined constitute the opposing surfaces. These circular or diametrical ribs are employed as supports for the bolting-cloth of the reel, and in order that the several ribs 42 may be adjusted at any time to perfect alignment they are connected with each longitudinal diamond-shaped rib 36 by set-screws 43, having their heads countersunk in the outer face of the ribs 42 and their inner ends passed into threaded apertures in the diamond-shaped ribs, as best illustrated in detail in Fig. 13, each set-screw being provided with an adjusting-nut 44, contacting with the inner face of the circular or diametrical ribs.

To prevent the bolting-cloth from being chafed or injured when tightened by frictional contact with the circular ribs, the outer face of each of said ribs is covered by a smooth piece of cloth 45 or its equivalent. (See Figs. 13 and 14.) The desired mesh of the bolting-cloth 46 is maintained a distance only at each side of the center of the reel to correspond in length with the fine-flour compartment 34, which compartment, as heretofore stated, is nearly of the same length as the shorter reel D. The remaining necessary length of the cloth, which must extend from end to end of the reel, is of such close mesh, as shown at $b$ in Fig. 1, that the material to be bolted cannot pass through it. This formation of the bolting-cloth is the same upon each of the reels.

The bolting-cloth at its rear end has a hem 47 formed therein, (see Figs. 8 and 10,) and the longitudinal edges of the cloth are made to overlap, as shown at $b'$ in Fig. 9, and is held in this position and stretched circumferentially by a cord 48 or a wire or its equivalent laced over studs 49, located in rows upon the outer face of the cloth, one row near each longitudinal edge, as is clearly shown in Fig. 8.

The attachment of the cloth to the tail-plate 12 is effected by passing through the hem 47 a stout wire 50, which is bent to fit in the peripheral groove 30 of the tail-plate, and eyes 51 are formed in the two ends of the wire. The said ends of the wire are drawn together by a bolt 52, passed through the eyes and provided with a suitable nut 53, as shown in Fig. 10. Thus a secure and rigid fastening is obtained for the rear end of the cloth and yet the cloth is rendered readily removable. The longitudinal adjustment of the cloth is effected at the head of the reel and is accomplished in the following manner: A wooden band or facing 54 is secured to the inner side of the head-plate 13, and a slight distance therefrom an adjustable ring 55, having its inner edge provided with annular recesses 56 to receive the longitudinal ribs 36 and 37, is loosely mounted upon said ribs in such manner as to be capable of lateral movement. The bolting-cloth near its free end is tacked or otherwise secured to the periphery of this sliding ring 55, and the extreme forward end of the cloth is secured to the facing-band 54. A number of bolts 57 are passed through the ring, the facing, and the head-plate at intervals, as shown in Figs. 4 and 5, the ring being best illustrated in Fig. 4, and the inner ends of the bolts are provided with nuts 58, which nuts are embedded in the ring. Thus by turning the nuts in the proper direction the loose ring may be drawn forward until a proper tension is exerted upon the cloth.

At the head of the reel A, and extending completely through the said reel at the will of the operator, a conveyer-conduit E is applied, consisting of a cylindrical casing 59, having closed ends and openings 60 in the top near each extremity for the reception of stock, and a screw 61, journaled in said casing, which may be of one pitch, or right and left, as desired. The screw is driven by a chain belt 62, connected with the main or drive shaft. The purpose of the conveyer is to conduct the stock to be operated upon into the reel both at the head and also at the tail. This reel A can also be supplied alone by a spout located at its head when circumstances demand it. The conveyer shown in the accompanying drawings is constructed to carry two classes of stock into the reel at the same time, the casing being to that end provided at its bottom with openings 63, adapted to be covered by dampers 64 when desired, which dampers are operated in any approved manner. One way of manipulating the dampers consists in normally holding them over the openings 63 by springs of any description, and the dampers are moved to uncover the openings through the medium of chains or ropes $64^a$, as shown in Fig. 1, one rope or chain being secured to each damper, and all of the ropes or chains are led outward at the tail of the machine a sufficient distance to be readily grasped by the operator. The stock, by reason of the dampers, is under perfect control by the operator, who is enabled to admit kindred stocks to any position inside of the reel, good stock always being at the head, with definitive tendency toward the tail. The intention is to admit good stock into the head of the conveyer and poor stock to the tail, and this without previous commingling. With reference to the bracing-rings 40, they are supported or rather are held in position by the diamond ribs being secured to their peripheries. The form of ring shown in Fig. 16 is used particularly when the conveyer is passed through the center of the reel; but the rings may be made to fit a shaft located in the center of the reel, in which event they are provided with spider-arms 65, as shown in Fig. 18, and by closing the space between the diamond ribs and the spider-arms a perfect dead-head and solid inner cylinder is formed, and the stock thus directed to the periphery will remain in that position from end to end of the reel. This cylinder may also be formed by employing alternate full diamond ribs, with three-quarters or trough-like diamond ribs arranged so closely as to touch each other throughout their length, as illustrated at E' in the said Fig. 18. I desire it to be emphatically understood that this inside reel A, whether used as an inside reel or as a single reel, may be constructed with the diamond ribs together as above referred to, so as to form a solid outside surface, or with the diamond ribs set apart or spaced; and, further, that the conveyer or shaft may be employed in connection with the reel, and the brace-rings may be made either with or without arms. The cloth-tightening devices may also be used or omitted, according to the will or desire of the constructer and the character of the stock to be operated upon within the reel. At this point it may be further remarked that the adjusting-ring 55 may be constructed as shown in Fig. 17, instead of as illustrated in Fig. 5. In Fig. 17 the said adjusting-ring is constructed of metal, and is provided upon its inner face with a series of inwardly-extending lugs 66, some of which lugs $d$ are provided at their inner ends with an angular casting or forging 67, adapted to conform to the outer apex of the full diamond ribs 36, the said casting or forging being adapted to slide upon said ribs. The lugs 66, intermediate of the particular lugs $d$ just referred to, are provided with apertures through which the bolts 57 are passed, which bolts, as in the form illustrated in Fig. 5, are passed through the facing 54 and the head 13, being provided at their outer ends with suitable nuts 58, as best shown in Fig. 17. When a metal adjusting-ring is employed, the cloth is attached thereto by means of bolts 68 or their equivalent.

The second reel B is situated immediately outside of the reel A. It is, however, entirely independent of said reel, mechanically speaking, having its own driving mechanism. The head and tail plates 69 and 70 are constructed in like manner to the corresponding plates of the inner reel, the tail-plate being provided with the stock-outlets 31 and the peripheral groove 30, and the head-plate with the inner wood facing-ring 54. The head and tail plates are held together by a series of heavy rods or tubes 71, the extremities of which are threaded and passed through suitable apertures 72 in the said plates, and the extremities of each rod or tube are provided with two jam-nuts 73 and 74, one contacting with the outer face of the plates and the other with the inner face of the tail-plate and the facing-ring 54 of the head, as best shown in Fig. 1. At given distances, say ten or twelve inches apart, the rods or tubes are pierced with holes through which bolts 75 are passed, threaded from their heads to their lower ends, as best shown in Fig. 14. The heads of the bolts are creased, whereby they may be manipulated with a screw-driver. Upon the bolts 75 three nuts 76, 77, and 78 are placed. The nuts 76 contact with the under surface of the rods, and the nuts 77 with the immediately-opposite upper surface, the outer nuts 78 being adapted for contact with the under surfaces of the circular ribs or bands 79, corresponding with the rings or bands 42 of the inner reel, which bands 79 encircle the inner reel, as shown in Fig. 1. In the outer face of these bands the heads of the bolts 75 are countersunk. The office of these nuts is to perfectly adjust the position of the bands upon the bolt 75 at the desired distance from the bracing rods or tubes 71, the nuts resting upon the bands and holding the same rigid between them and the heads of the bolts, while the other nuts equalize the distance of the bands from the rods. The bands or circular ribs 79 follow in general order throughout the entire length of the reel and produce a cylindrical reel or frame, upon which is placed the bolting-cloth 46 after the bands have been provided with the covering 45, heretofore alluded to, which may consist of canton-flannel or other soft material. This is done in order to protect the bolting-cloth from wear upon the metal bands. The adjusting-ring 80 corresponds to the ring 55 of the inner reel, and is usually made of wood bored to receive the brace-rods or tubes upon which it is capable of sliding, and, as in the central reel, adjusting-bolts are passed through the ring, the head, and its facing, whereby the bolting-cloth, which is also attached in the manner heretofore described, may be stretched longitudinally, the circumferential adjustment being the same as that employed in connection with the reel A.

The construction of the reels B, C, and D is of a similar character, and therefore the description of one is sufficient. The only point of difference consists in their diameter and length, it being readily observed by reference to Fig. 1 that one reel overlaps the other endwise, creating a series of steps at each end of the apparatus, as heretofore described, the longest reel being the inside one and the shortest the outside, although the diameters are increased in the outer successive reels. There are these important differences in the operation, however: Each reel makes its revolution independent of the other. Each reel works an independent cloth and has an independent brush, to be hereinafter described. Each reel has its independent cloth-tightening device and its independent drive and supporting wheels. Each reel has its independent longitudinal ribs or braces and performs its own independent functions, one wheel working one way in rotating while the next works in the opposite direction, or all can be rotated in one direction, if desired.

The heads of the reels A, B, C, and D are prevented from leaking and dusting, and likewise the tail of the center reel, by applying thereto a dead-head 81. These dead-heads are alike in construction, and consist of a ring of wood made of a number of segments $e$, connected by straps $e'$, as best shown in Fig. 15, the exterior diameter of the rings being slightly less than the diameter of the head or tail plate opening into which they are adapted to be inserted, and upon opposite edges of each ring a dusting material 82, such as sheepskin with the wool on or hide with the hair or fur on, is tacked or otherwise secured, the said dusting material being so attached that the wool, fur, or hair, when the dead-head is used in connection with the center reel, will contact with the wall of the head and tail plate opening and the outer surface of the conveyer-casing, as shown in Fig. 1.

A dead-head is located in the head-opening of each of the reels B, C, and D, the dusting-surfaces being in contact with the wall of their openings and the cloth of the next inner reel. The dead-heads are held stationary by timbers 83, attached thereto and to the frame of the apparatus, as best shown in Fig. 2.

The walls of the opening in the inner partition 33 and the front partition 11, made to accommodate the reels, are likewise provided with a dead-head 84, the dusting material whereof comes in contact with the cloth of the outer reel. The cloth of each reel, with the exception of the cloth of the outer reel D, is swept as it approaches the top of the apparatus by a series of stationary brushes 85, the head whereof consists of a bar 86, of wood or metal, which passes through the dead-heads and projects beyond the heads and tails of the reels, being supported from the top and sides of the frame of the apparatus by brackets 87, as best shown in Fig. 1. The cloth of the outer reel D is swept by brushes 88, secured to a revoluble shaft 89, journaled in suitable bearings at the rear of the apparatus, as best shown in Fig. 3, which shaft is driven by a belt connection 90 with one of the lower shafts 21, as illustrated in Fig. 2.

It has been mentioned that the reel A is provided with full and open diamond-shaped longitudinal braces, making a broken or a continuous circle, and it will be noticed that the three outer reels are shown and described as not being supplied with such ribs. I desire it to be understood that every reel may be constructed with full diamond and open diamond-shaped ribs, as explained with reference to the reel A, and also so set apart that the material operated upon shall fall between the diamond ribs and through the cloth onto the next reel with its diamond ribs and cloth, and so continue from one to the other consecutively. I further desire it to be understood that I do not restrict myself to the production of a four-reeled machine only, as I contemplate making machines containing one, two, three, or four reels, and also to reconstruct hexagon reels to conform to the inside reel.

The flour passing through the outer cloth is deposited in conveyers 91 and 92, placed side by side or otherwise at will at the bottom of the flour chamber or chest 34, and upon the division-board 93 of the conveyer-boxes a series of dampers are pivoted, which dampers may be manipulated in any approved manner to direct the flour to any one conveyer—as, for instance, by means of a crank or cranks 94, connected with the pivotal pins of the dampers. In the bottom of the conveyer-boxes openings 95 are produced at desirable points for the delivery of the flour. The conveyers may be rotated in any well-known manner. In the drawings the shafts of the conveyers are represented as connected by a chain belt 96 with one of the shafts 21.

The operation of my improved machine is as follows: When the machine is in operation, the mechanical arrangement of the rotative agents turns one reel one way and the next the other way (or to the contrary) consecutively, or all one way at will. The cylinders are so rotated that the cloth of one reel moves as many feet per minute as the other, be it large or small. The inner reel is clothed with coarse cloth-wire, grits-gauze, bolting-cloth, or punctured zinc, the next finer, the third still finer, and the outside the finest of all, the preferred grades having been heretofore mentioned. The stock to be operated upon is presented to the inner reel from a burr or roller mill or other granulating device, and is received into the reel at its head. The material comes in contact with the coarsest cloth, situated at the head of this reel—say No. 16 wire. Directly within the reel and situated some fifteen inches from the entrance of the stock the entered material comes in contact with one of the obstructing-rings 40, which directs it to the periphery of the reel. By the rotation of the reel the entered material is carried in the direction of the travel of the reel to the point of gravitation, where it inclines to a downward tendency, but is caught by the points of the full diamonds and upon the open diamonds, which latter fill with material at an angle of about forty-five degrees, and the material is redirected again to the surface of the cloth. The surplus accumulation consequent upon the travel of the reel in one direction (and exceeding the needed supply of material requisite upon the cloth and between it and the longitudinal tubes or rods or points of diamonds) is caught by the open diamonds and elevated over the point of gravitation and deposited upon the cloth on the opposite side of the reel, and in its descent to the bottom of the reel the material is caught by the points of the full diamonds and backs of the open diamonds and again redirected to the surface of the cloth until it reaches the point of rest at the bottom of the reel. The rapidity of the time of travel of the stock from the head of the reel to the tail is regulated by raising or lowering the reels at the tail by the jacks heretofore described or their equivalent. It will be seen that the material as it enters the central reel A presents the largest volume of stock. Being subjected to the coarsest cloth a large volume of this stock necessarily falls to the next cloth. The head of the cloth of the inner reel A being relieved of its load, the residuum remaining is of a coarser nature of material, retaining with it the light fibrous material also, which is sought to be eradicated in the manufacture of perfect goods. As this travels within the center reel A toward the tail of the machine, it passes over a slightly finer wire—say a No. 20 wire-cloth. This operation relieves the residuum above alluded to of more of its load, depositing it upon the cloth below, but at a different position from the former number of cloth, and is of a much inferior quality. The balance of the load passes over still another number of cloth still finer than the preceding numbers, through which is taken all the remaining flour contained in the material within the reel. The stock then being thoroughly dusted of flour passes to the next granulating device, and is again to be subjected to other reductions to the finish, be they many or few. The stock at the head of the reel A, being separated as described, is of a pure quality, as nothing as yet of the fiber has been able to reach the cloth on account of the bulk of material contained within. In this condition it is bolted immediately on a silk or grits-gauze cloth—say No. 52 grits-gauze. The material passing through this cloth at this position drops to the next reel, clothed with, say, a No. 10 bolting-cloth. The residuum passes onto this No. 10 cloth through No. 64 grits-gauze and No. 8 bolting-cloth at the tail, though in different positions. The middlings taken through the wire-cloth and scalped over the latter cloth are taken at once to the middlings-purifier for treatment. The material at the head of the machine having been deposited there in a still further state of purity now receives its final and third scalping, and all in its relative positions as to the qualities produced. This cloth gives off at the tail all middlings which have been passed with the flour through the preceding cloths and deposited over its tail to the appointed purifiers for purification. The material has now been scalped three times in succession and by as many cloths without any mixing or contaminating influences, and is now subjected to the outer and circumferentially larger reel D, clothed with, say, No. 14 bolting-cloth. The action of this cloth produces the effect of the preceding scalping, depositing at its head through the cloth a perfect flour, pure in its quality, perfect in granule, and free of fiber. Toward its center it begins to produce a lower quality, and at its farther end or tail the poorest flour is derived.

A summary of the process which has been above stated may be made as follows: first, break stock to the following reduction-machine; second, coarse middlings to coarse-middlings purifier; third, medium middlings to medium-middlings purifier; fourth, fine middlings to fine-middlings-reduction device; fifth, first quality of flour; sixth, second quality of flour; and seventh, third quality of flour, all of which has been accomplished without gathering material from the tail of one reel (which may be even taken through the same number of cloth as that on the head of the reel, but which on account of travel and consequent depletion of stock from the former number of reel has been impoverished and renders a very low grade compared with the head of the reel) to the head of the following one, as is now practiced in every system of milling at present universally employed.

It will be seen that many important results are simultaneously accomplished by the operation of the device. First, it economizes respecting flour-space; second, it economizes respecting power required to manufacture the volume of material as ordinarily supplied compared with well-known systems; third, it is economical respecting the use of elevators and conveyers compared with many other systems; fourth, it produces a thoroughly-prepared break-stock for the following reduction and it produces thoroughly-dusted middlings for the purifier; fifth, it produces thoroughly-separated fine middlings to be carried to the fine-middlings-reducing device; sixth, it relieves good material of its impurities and at the commencement; it is free of the fault of mingling dirty stock with clean, and it exterminates impurities and forbids its admittance to any grade better than its class assigns it. It also accomplishes a classification of grades in succession, and keeps its grades pure from beginning to finish.

Having thus described my invention, I claim as new and desire to secure by Letters Patent—

1. The combination, with a bolting-reel, of driving-sheaves engaging the head and adapted to revolve the reel, mechanism for rotating said driving-sheaves, and adjustable sheaves engaging the tail, as specified.

2. The combination, substantially as described, of a series of reels arranged one within the other, independent driving-sheaves engaging each of said reels, a drive-shaft, and connections between the said drive-shaft and the drive-sheaves of the several reels, all substantially as set forth.

3. The combination, substantially as described, of a bolting-reel, a conveyer-casing extended within and from end to end of the reel and having inlets at its ends and a discharge between its ends within the reel, and a conveyer in the said casing, substantially as set forth.

4. The combination, with a bolting-reel, of a casing within the reel provided with inlets and valved outlets, and a screw conveyer journaled in said casing, substantially as and for the purpose specified.

5. The combination, with a bolting-reel and a casing supported within the same projected beyond the head and tail and provided with an inlet at its ends and valved outlets, of a right and left screw conveyer journaled in said casing, as and for the purpose specified.

6. The combination, with the head and tail plates of a bolting-reel, of a conveyer centrally located within the reel and provided with inlet and outlet apertures, and a series of ribs, essentially diamond-shaped in cross-section, arranged longitudinally around the conveyer between it and the bolting-cloth of the reel, substantially as shown and described.

7. The combination, with the head and tail plates of a reel, of a series of circularly-arranged ribs longitudinally located within the reel, some of which are diamond-shaped in cross-section and the others trough-like, presenting, essentially, a broken diamond shape in cross-section, substantially as shown and described.

8. The combination, with the head and tail plates of a reel, of a series of circularly-arranged ribs longitudinally located within the reel, some of which are diamond-shaped in cross-section and the others trough-like, representing, essentially, a broken diamond in cross-section, rods projected through the diamond-shaped ribs and the head and tail plates, securing the latter at suitable distances apart, blocks attached within the broken diamond-shaped ribs at their ends, and bolts passed through said blocks into the head and tail plates of the reel, substantially as shown and described, and for the purpose specified.

9. The combination, substantially as described, of a bolting-reel, a conveyer-casing within the same having inlets at its ends and a discharge intermediate its ends, and a right and left hand screw conveyer operating in the said casing, substantially as set forth.

10. The improved machine for scalping and bolting flour, comprising a plurality of bolting-reels arranged one within the other and supported to revolve independently, whereby said reels may be revolved at different speeds and in opposite directions, and mechanism for revolving the adjacent ones of such reels in opposite directions, whereby the stock will be bolted from one reel upon a clear portion of the next outer reel—that is to say, upon a portion of the cloth of said outer reel not covered by the stock therein, all substantially as and for the purposes set forth.

11. An improved machine for scalping and bolting flour, comprising a plurality of reels arranged one within the other and adapted to be revolved independently, whereby the reels may be revolved independently and in opposite directions, and the clothing of said reels being of different degrees of fineness, the clothing grading from a coarse mesh on the center reel to a fine finishing mesh on the outer reel, substantially as set forth.

12. An improved machine for scalping and bolting flour, comprising a series of independent reels arranged one within the other and supports for said reels, the supports for each reel being independent of those of the others, whereby the reels are supported independently and may be revolved independently of each other, all substantially as set forth.

13. In a machine, substantially as described, the combination of the series of reels arranged one within the other and made of different lengths, the center reel being the longest and the outer reel the shortest, sheaves arranged to engage and support such reels, the sheaves supporting each reel being independent of those supporting the others, the main frame or casing, and the supports for the sheaves, all substantially as and for the purposes set forth.

14. The combination of a series of reels supported one within the other, a pair of driving-sheaves for each reel arranged to engage such reel upon opposite sides of a line drawn vertically through its axis, gear-wheels connected with said sheaves and arranged in trains on opposite sides of the center of the machine, and a drive-gear meshing the inner gears of each side train, substantially as set forth.

JOHN METHERELL.

Witnesses:
J. P. WILLIAMS,
RANDAL CURELL.